United States Patent
Tompkins et al.

(10) Patent No.: US 12,490,051 B2
(45) Date of Patent: Dec. 2, 2025

(54) PROXIMITY BASED OUTPUT SELECTION FOR COMPUTING DEVICES

(71) Applicant: Google LLC, Mountain View, CA (US)

(72) Inventors: Stephen Scott Tompkins, San Jose, CA (US); Federico Villa, Brooklyn, NY (US); Joshua Principe, Los Angeles, CA (US); Sameer Kumar Bansal, San Francisco, CA (US); Josef Stephen Burnham, Cheshire (GB); Robert Hugh Tansley, St Albans (GB)

(73) Assignee: Google LLC, Mountain View, CA (US)

( * ) Notice: Subject to any disclaimer, the term of this patent is extended or adjusted under 35 U.S.C. 154(b) by 391 days.

(21) Appl. No.: 18/295,779

(22) Filed: Apr. 4, 2023

(65) Prior Publication Data

US 2024/0340612 A1     Oct. 10, 2024

(51) Int. Cl.
*H04W 4/02*          (2018.01)
*H04W 4/80*          (2018.01)
*H04W 8/00*          (2009.01)

(52) U.S. Cl.
CPC ............. *H04W 4/023* (2013.01); *H04W 4/80* (2018.02); *H04W 8/005* (2013.01)

(58) Field of Classification Search
CPC ....... H04W 4/023; H04W 4/80; H04W 8/005; H04W 4/20; H04W 84/12; H04N 21/41407; H04N 21/42202; H04N 21/4312; H04N 21/43637; H04N 21/44227; G06F 3/0482;
(Continued)

(56) References Cited

U.S. PATENT DOCUMENTS

| | | |
|---|---|---|
| 8,958,896 B2 | 2/2015 | McKillop et al. |
| 10,101,884 B2 * | 10/2018 | Dipin ............... G06F 1/1698 |
| 10,880,720 B2 | 12/2020 | Onohara et al. |

(Continued)

FOREIGN PATENT DOCUMENTS

| | | |
|---|---|---|
| JP | 2003177980 A | 6/2003 |
| JP | 2004320209 A | 11/2004 |

(Continued)

OTHER PUBLICATIONS

Response to Extended Search Report dated Aug. 7, 2024, from counterpart European Application No. 24168129.5 filed Mar. 14, 2025, 15 pp.

(Continued)

*Primary Examiner* — Santiago Garcia
(74) *Attorney, Agent, or Firm* — Shumaker & Sieffert, P.A.

(57) ABSTRACT

In general, techniques are described for performing proximity-based output selection. A computing device comprising one or more network interfaces and processing circuitry may be configured to perform the techniques. The one or more network interfaces may communicate with one or more available outputs for playing content. The processing circuitry may determine a proximity to the computing device for each of the one or more available outputs, and determine, based on the proximity determined for each of the one or more available outputs relative to every other one of the one or more available outputs, a ranked list of available outputs. The processing circuitry may next interface, with a display, a graphical user interface that includes at least a portion of the ranked list of available outputs.

16 Claims, 9 Drawing Sheets

(58) Field of Classification Search
CPC .............. G06F 3/0484; G06F 3/04817; H04M 1/72412; H04R 3/12
See application file for complete search history.

(56) References Cited

U.S. PATENT DOCUMENTS

| | | | |
|---|---|---|---|
| 11,330,339 B2* | 5/2022 | Hu ........................... | G06F 1/163 |
| 11,394,806 B2* | 7/2022 | Elcock ................. | H04N 21/436 |
| 12,289,423 B2* | 4/2025 | Kumar Agrawal ..... | G06F 1/163 |
| 2015/0324078 A1* | 11/2015 | Dipin .................... | G06F 3/0482 715/765 |
| 2016/0299978 A1* | 10/2016 | Narayanan .......... | G06F 16/2477 |
| 2017/0017451 A1* | 1/2017 | Sathyanarayana Raghu ............... | G06F 3/1454 |
| 2021/0006915 A1* | 1/2021 | Hegde .............. | H04N 21/43615 |
| 2021/0170231 A1* | 6/2021 | Paxia ................. | A63B 24/0021 |
| 2022/0155946 A1 | 5/2022 | Sharifi et al. | |
| 2023/0297324 A1* | 9/2023 | Yu ........................... | H04R 3/12 700/94 |
| 2024/0098171 A1* | 3/2024 | Kumar Agrawal .......................... | H04M 1/72415 |
| 2024/0212484 A1* | 6/2024 | Park ...................... | H04W 4/023 |

FOREIGN PATENT DOCUMENTS

| | | | |
|---|---|---|---|
| JP | 2005253081 A | 9/2005 | |
| JP | 2005303423 A | 10/2005 | |
| JP | 2013225809 A | 10/2013 | |
| WO | 2018146982 A1 | 8/2018 | |
| WO | 2022108953 A1 | 5/2022 | |

OTHER PUBLICATIONS

Extended Search Report from counterpart European Application No. 24168129.5 dated Aug. 7, 2024, 7 pp.

Google, "Wear OS user interfaces", May 5, 2022, 5 pp., Retrieved from https://developer.android.com/training/wearables/design/design-principles.

Google, Design Principles, Android Developers, 5 pp., May 5, 2022, Retrieved from https://developer.android.com/training/wearables/user-interfaces.

Jian Xu et al., "UIWear: Easily adapting user interfaces for wearable devices", 2017, 14 pp., (Applicant points out, in accordance with MPEP 609.04(a), that the year of publication, 2017, is sufficiently earlier than the effective U.S. filing date, so that the particular month of publication is not an issue.).

Samsung Newsroom U.S et al., "New Galaxy Watch and Watch Active UX Offers Users Enhanced Features Found on Galaxy Watch Active2", Nov. 18, 2019, 6 pp., Retrieved from https://news.samsung.com/US/galaxy-watch-active2-ux-offers-users-enhanced-features/.

Samsung Newsroom U.S., "MWC 2021: Samsung Presents New Watch Experience with a Sneak Peek of One UI Watch", Jun. 28, 2021, 7 pp., Retrieved from https://news.samsung.com/us/mwc-2021-samsung-new-one-ui-watch-experience/.

Wired Article, "New Spotify feature", Downloaded Jan. 6, 2023, 42 pp.

Zac Hall, "How to sync and play music from Apple Watch without iPhone", 9to5Mac, Jan. 27, 2017, 8 pp., Retrieved from https://9to5mac.com/2017/01/27/how-to-sync-play-music-apple-watch-without-iphone/.

Office Action, and translation thereof, from counterpart Korean Application No. 10-2024-0041629 dated Jul. 31, 2025, 14 pp.

Response to Office Action dated Jun. 18, 2025, from counterpart Japanese Application No. 2024-060107 filed Sep. 16, 2025, 14 pp.

Notification of Reason for Refusal and Search Report, and translation thereof, from counterpart Japanese Application No. 2024-060107 dated Jun. 18, 2025, 93 pp.

* cited by examiner

PROXIMITY BASED OUTPUT SELECTION FOR COMPUTING DEVICES

BACKGROUND

Computing devices are increasingly being designed to form a cohesive media ecosystem that enable users to consume media content, such as video and/or audio, across computing devices. Computing devices, such as smartphones (or other cellular devices), tablet computers, laptop computers, smartwatches, head mounted displays (such as augmented reality devices, virtual reality devices, smart glasses, etc.), smart televisions, smart speakers, headphones (including ear buds), and the like, may interchangeably, in most instances, be configured as source devices ("sources") that source the media content and/or output devices ("outputs") that output or otherwise play the media content.

One or more controlling computing devices (e.g., usually smartphones and/or smartwatches, but also tablet computers and/or laptop computers) within the media ecosystem may provide an interface with which a user may interact to configure computing devices, including the controlling computing devices, within the media ecosystem as sources and outputs. In this way, controlling computing devices may enable the one or more sources in the media ecosystem to transmit, via a network formed to support the media ecosystem, (or, in other words, "cast") media to the one or more outputs configured within the media ecosystem for consumption by the user.

SUMMARY

Various aspects of the techniques described in this disclosure enable a computing device to present a proximity-based list of available output devices for playing content within a media ecosystem. Rather than present an unordered list (or a list ordered on some other factor, such as previous total time of use, recent use, network connectivity status, etc.) in a graphical user interface, a computing device (which may also be referred to as a controlling computing device) may present a ranked list of available outputs that is ranked according to a proximity from the controlling computing device to each of the one or more available outputs. By ranking the available outputs by proximity to the controlling computing device, the controlling computing device may better facilitate user interaction in selecting the available outputs in a manner that may most likely anticipate a user's preference.

For some types of controlling computing devices, such as wearable computing devices having limited power sources (e.g., wearable computing devices with smaller battery capacities compared to other larger form factors, such as smartphones, tablet computers, laptop computers and the like), various aspects of the proximity-based output selection techniques may enable the smartwatch to identify a type of a potential source application executed by the source for providing media content. Using this type for the source application, the wearable computing device may better assess whether the application is likely to transmit (or, in other words, "cast") content to the available outputs.

Responsive to determining that the type of the source application corresponds to an acceptable type for casting content to the available outputs, the wearable computing device may perform the proximity determination noted above for each of the available outputs. Responsive to determining that the type of the source application does not correspond to an acceptable type for casting content to the available outputs, the wearable computing device may refrain from performing the proximity determination noted above for each of the available outputs so as to avoid potentially unnecessary power consumption.

In this way, various aspects of the techniques may improve operation of the controlling computing device itself. By presenting the ranked list of available outputs premised upon available output proximity, the controlling computing device may enable users to more efficiently identify one or more available outputs without having to scroll the interface and possibly reduce incorrect selection of available outputs. Avoiding scrolling operations and possible incorrect selection of available outputs may reduce consumption of computing resources of the controlling computing device, such as processor cycles, bus bandwidth, memory, etc. and associated power consumption. By only performing available output proximity determination for acceptable types of applications, the controlling computing device may preserve such computing resources in instances where it is unlikely that content will be cast.

In one example, the disclosure is directed to a computing device comprising: one or more network interfaces configured to communicate with one or more available outputs for playing content; and processing circuitry configured to: determine a proximity to the computing device for each of the one or more available outputs; determine, based on the proximity determined for each of the one or more available outputs relative to every other one of the one or more available outputs, a ranked list of available outputs; and interface, with a display, a graphical user interface that includes at least a portion of the ranked list of available outputs.

In another example, the disclosure is directed to a method comprising: determining, by processing circuitry, a proximity to the computing device for each of one or more available outputs; determining, by the processing circuitry and based on the proximity determined for each of the one or more available outputs relative to every other one of the one or more available outputs, a ranked list of available outputs; and interfacing, by the processing circuitry and with a display, to output a graphical user interface that includes at least a portion of the ranked list of available outputs.

In another example, the disclosure is directed to a non-transitory computer-readable storage medium having instructions stored thereon that, when executed, cause one or more processors to: determine a proximity to the computing device for each of one or more available outputs; determine, based on the proximity determined for each of the one or more available outputs relative to every other one of the one or more available outputs, a ranked list of available outputs; and interface, with a display, to output a graphical user interface that includes at least a portion of the ranked list of available outputs.

In another example, the disclosure is directed to an apparatus comprising: means for determining a proximity to the computing device for each of one or more available outputs; means for determining, based on the proximity determined for each of the one or more available outputs relative to every other one of the one or more available outputs, a ranked list of available outputs; and means for interfacing, with a display, to output a graphical user interface that includes at least a portion of the ranked list of available outputs.

The details of one or more examples are set forth in the accompanying drawings and the description below. Other features, objects, and advantages of the disclosure will be apparent from the description and drawings, and from the claims.

DETAILED DESCRIPTION

Figure 1:
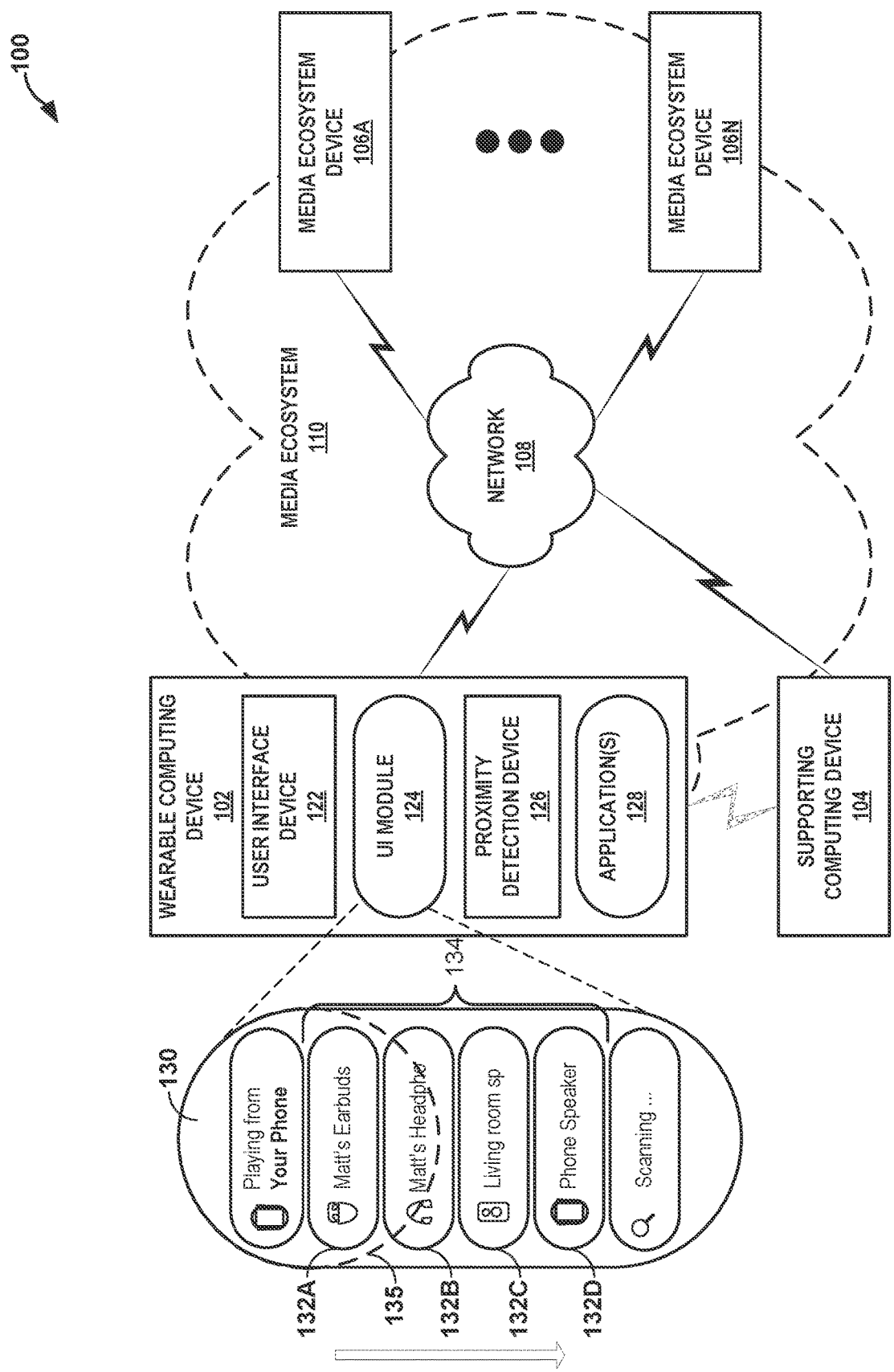
FIG. 1 is a block diagram illustrating a computing system which is configured to perform various aspects of the proximity-based output selection techniques as described in this disclosure.

FIG. 1 is a block diagram illustrating a computing system which is configured to perform various aspects of the proximity-based output selection techniques as described in this disclosure. As shown in the example of FIG. 1, computing system 100 includes wearable computing device 102, supporting computing device 104, and media ecosystem devices 106A-106N ("media ecosystem devices 106").

Wearable computing device 102 may represent any type of device that a user may wear, such as a smartwatch, a head mounted display (such as a virtual reality headset, an augmented reality headset, a mixed reality headset—which collectively may be referred to as extended reality headsets, smart glasses, etc.), a smart ring, and the like, that is capable of presenting a graphical user interface. In the example of FIG. 1, wearable computing device 102 is assumed to represent a smartwatch for purposes of illustration, and as such may be denoted as "smartwatch 102." While various aspects of the techniques are described herein with respect to a smartwatch or other wearable computing device, various aspects of the techniques may be performed by any type of computing device that is capable of determining a proximity as described below in more detail.

Supporting computing device 104 may represent any type of computing device capable of interfacing (often directly via a personal area network—PAN—or some other direct network as denoted by the dashed, hashed lightning bolt, and/or via network 108) with wearable computing device 102 in a supporting role, which may involve sourcing content for display at wearable computing device, supporting various functionality (such as access to networks, including cellular networks, offloading execution of tasks by wearable computing device 102, capturing images, providing global positioning system—GPS—coordinates, and the like). It is assumed, for purposes of illustration, that supporting computing device 104 represents a smartphone and as such may be referred to herein as "smartphone 104." While described below with respect to smartphone 104, various aspects of the techniques may be performed by any type of computing device capable of supporting various functionality on behalf of smartwatch 102, such as a tablet computer, a laptop computer, a gaming system (including portable gaming systems), a head mounted display, etc.

Media ecosystem devices 106 may represent any type of device capable of joining a media ecosystem to act as source devices (which may be referred to as "sources") and/or output devices (which may be referred to as "outputs") for media content. An ecosystem refers to a common framework by which devices may interact to facilitate joint operation to achieve various functionality. In this instance, the ecosystem allows discoverability of available sources and available outputs to configure a network session by which sources may transmit (often wirelessly, which may be referred to as "casting") media content for playback or reproduction by outputs. This media ecosystem may provide various application programming interfaces (APIs) by which to invoke the discoverability, network sessions, and general coordination for presenting media content for consumption by one or more users.

Media ecosystem devices 106 may include a wide range of different device types. Examples of media ecosystem devices 106 are set-top boxes, so-called streaming boxes or sticks, gaming devices, gaming controllers, audio/visual (A/V) systems, smart televisions (including smart displays), smartphones, head mounted displays (including extended reality devices and smart glasses), smart speakers, smart headphones (including smart headsets, and smart earbuds), headphones (including headsets and earbuds), hearing aids, etc. Generally, a controlling computing device, such as smartwatch 102 and/or smartphone 104 (but also laptop computers, desktop computers, smart displays, etc.) may interface with media ecosystem devices 106 to configure access by media ecosystem devices 106 to the media ecosystem (often by configuring network properties for connecting to a network 108 and adding media ecosystem authentication information, usually in the form of a profile username or email address and password).

In the example of FIG. 1, the media ecosystem is shown as a dashed, cloud that is denoted as media ecosystem 110. Media ecosystem 110 may be supported by backend servers that are hosted by a consortium, designer, manufacturer and/or other producer of hardware included within and/or software (including operating systems) executed by wearable computing device 102, supporting computing device 104, and media ecosystem devices 106.

Network access to backend servers is obtained via a network 108. Network 108 may represent any public or private communication network, including the Internet, cellular networks, local area networks (LANs), wireless LANs (WLANs), etc. Wearable computing device 102, supporting computing device 104, and media ecosystem devices 106 may send and receive data (often in the form of packets or other data units) via network 108 using any suitable communication protocols.

Network 108 may include network hubs, network switches, network routers, etc., that are communicatively inter-coupled thereby providing for the exchange of the data between wearable computing device 102, supporting computing device 104, and media ecosystem devices 106. In some examples, network links (denoted by solid lightning bolts) may be Ethernet, ATM or other network connections. Such connections may be wireless and/or wired connections.

In any event, as shown in FIG. 1, wearable computing device 102 includes a user interface device (UID) 122. UID 122 of wearable computing device 102 may function as an input device for wearable computing device 102 and/or as an output device (e.g., in the case of a presence-sensitive display). UID 122 may be implemented using various technologies. For instance, UID 122 may function as an input device using a microphone and as an output device using a speaker to provide an audio based user interface. UID 122 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 122 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information, such as a graphical user interface, to the user of wearable computing device 102.

UID 122 of wearable computing device 102 may include a presence-sensitive display that may receive tactile input from a user of wearable computing device 102. UID 122 may receive indications of the tactile input by detecting one or more gestures from a user of wearable computing device 102 (e.g., the user touching or pointing to one or more locations of UID 122 with a finger, a stylus, or some other implement). UID 122 may present output to a user, for instance at a presence-sensitive display. UID 122 may present the output as a graphical user interface which may be associated with functionality provided by wearable computing device 102. For example, UID 122 may present various user interfaces of applications executing at or accessible by wearable computing device 102 (e.g., an electronic message application, a navigation application, an Internet browser application, etc.). A user may interact with a respective user interface of an application to cause wearable computing device 102 to perform operations relating to a function.

Wearable computing device 102 may include user interface ("UI") module 124. UI module 124 may perform operations described using software, hardware, firmware, or a mixture of hardware, software, and firmware residing in and/or executing at wearable computing device 102. Wearable computing device 102 may execute UI module 124 with multiple processors. Wearable computing device 102 may execute UI modules 124 as a virtual machine executing on underlying hardware. UI module 124 may execute as one or more services of an operating system, a computing platform. UI module 124 may execute as one or more remote computing services, such as one or more services provided by a cloud and/or cluster based computing system. UI module 124 may execute as one or more executable programs at an application layer of a computing platform.

UI module 20 may cause UID 12 to present audio (e.g., sounds), graphics, or other types of output (e.g., haptic feedback, etc.) associated with a user interface with which a user may interact to perform features and/or functions of wearable computing device 102. UI module 20 may receive information various modules and/or other software (such as the operating system, which is not shown for ease of illustration purposes) to alter or otherwise change the presentation of a user interface at UID 122.

In the context of media ecosystem 110, smartwatch 102 is assumed, for purposes of illustration, to represent the controlling device that configures the output for media content playback for consumption by users. In order to select the outputs for media ecosystem 110, smartwatch 102 may invoke UI module 124 to generate a graphical user interface 130 that displays a list of available outputs 132A-132D ("available outputs 132," which may include a graphical icon representative of a device type, such as earbuds, headphones, speaker—including smart speaker, phone speaker, etc.).

In some instances, smartwatch 102 may maintain the list of available outputs 132 that have been previously paired or otherwise connected to smartwatch 102 and/or supporting computing device 104. Smartwatch 102 and/or supporting computing device 104 may also maintain a list of available outputs 132 currently configured to interact with media ecosystem 110. Smartwatch 102 may further, in some instances, interface with supporting computing device 104 to obtain the list of available outputs 132. Regardless, smartwatch 102 may, when invoking UI module 124 using an API function call exposed by UI module 124, pass (e.g., via a pointer) the list of available outputs 132, which UI module 124 uses when generating graphical user interface (GUI) 130 ("GUI 130").

Responsive to generating GUI 130, UI module 124 may interface with UID 122 to present at least a portion of GUI 130. The portion of GUI 130 is denoted as exposed GUI display 135, which reflects the geometry of UID 122 of smartwatch 102 (which in this example is assumed to be circular similar to most mechanical watches).

UI module 124 may be configured to arrange available outputs 132 in a number of different ways. In some instances, UI module 124 may order available outputs 132 in a list 134 based on the arrangement of available outputs 132 presented when passed to UI module 124. Smartwatch 102 may arrange available outputs 132 in list 134 according to frequency of use, time of use, most recently used, or other factors in an attempt to better anticipate which of available outputs 132 should first appear in exposed GUI display 135, which may allow the user to more efficiently select available outputs 132 without having to scroll or otherwise alter which portion of GUI 130 is displayed via user interface device 122. However, this arrangement of available outputs 132 may not efficiently anticipate the users preference as the arrangement of available outputs 132 may fail to address an existing context in which smartwatch 102 is operating.

In accordance with various aspect of the techniques described in this disclosure, smartwatch 102 may present a proximity-based list of available output devices 132 for playing content media ecosystem 110. Rather than present an unordered list (or a list ordered on some other factor, such as previous total time of use, recent use, network connectivity status, etc.) in GUI 130, smartwatch 102 may present a ranked list 134 of available outputs 132 that is ranked according to a proximity from smartwatch 102 to each of available outputs 132. By ranking available outputs 132 by proximity to smartwatch 102, smartwatch 102 may better facilitate user interaction in selecting available outputs 132 in a manner that may most likely anticipate a user's preference.

As further shown in the example of FIG. 1, smartwatch 102 may include a proximity detection device 126 that represents hardware or a combination of hardware and software (including firmware, middleware, and/or program code) configured to determine a proximity from smartwatch 102 to one or more available outputs (which as noted above may include smartwatch 102, smartphone 104, and/or media ecosystem devices 106). Proximity detection device 126 may include an interface, such as a network interface, by which to determine a round trip time (RTT), such as by way of a so-called network ping, between smartwatch 102 and available outputs 132 that are graphical representations of one or more of smartwatch 102, smartphone 104, and/or media ecosystem devices 106.

Alternatively or in conjunction with the network interface, proximity detection device 126 may represent a PAN interface (which is one example of a network interface) by which to communicate pings or other packets capable of determining a RTT between smartwatch 102 and available outputs 132. Further, proximity detection device 126 may represent, either in conjunction with or as an alternative to the above examples, a radar detection device, a camera, and/or any other sensors capable of determining either via radar, image inspection, etc. a proximity from smartwatch 102 and available outputs 132. Proximity refers to an approximate distance between smartwatch 102 and available outputs 132.

Proximity detection device 126 may pass (e.g., via pointer) each proximity (e.g., which may defined in a table, a list, and or other data structure capable of storing the proximities) to UI module 124. UI module 124 may be configured to determine, based on the proximity from smartwatch 102 to each of available outputs 132, a ranked list of available outputs 132, where such list is denoted as list 134 in the example of FIG. 1. UI module 124 may arrange available outputs 132 in list 134 from closest proximity from smartwatch 102 to farthest proximity from smartwatch 102 (where the arrow on far left of FIG. 1 denotes this closest to farthest proximity ranking). UI module 124 may next interface, with a display represented in this example by user interface device 122, to output GUI 130 that includes at least a portion (shown as exposed GUI display 135 in the example of FIG. 1) of ranked list 134 of available outputs 132.

While described with respect to this closest to farthest proximity ranking, UI module 124 may perform proximity-based ranking in other ways (such as farthest to closest) or perform proximity-based ranking that incorporates other factors, such as those listed above. In some instances, UI module 124 may perform a form of weighted ranking that incorporates a weighted ranking of factors (including proximity) that results in pseudo proximity based ranking of available outputs 132.

For some types of controlling computing devices, such as smartwatch 102 having limited power sources with smaller battery capacities compared to other larger form factors, such as smartphones, tablet computers, laptop computers and the like), various aspects of the proximity-based output selection techniques may enable smartwatch 102 to identify a type of a potential source application executed by the source for providing media content. In the example of FIG. 1, it is assumed for purposes of illustration that smartwatch 102 is operating as the source configured to execute one or more applications 128 ("application(s) 128") that source media content for playback by one or more of available outputs 132 for consumption by the user.

Applications 128 may represent applications that execute in an application space exposed by an underlying operating system having a kernel that executes in kernel space. Kernel space differs from application space in terms of privileges, where kernel space permits the kernel to interface with the underlying hardware of smartwatch 102. Kernel may expose a more limited and restricted access to the underlying hardware of smartwatch 102 and acts as an intermediary to negotiate access to the underlying hardware of smartwatch 102 by applications 128 executing in the application space. Applications 128 may represent first party application developed and deployed along with the operating system and/or third-party applications developed and installed separate from the operating system.

Applications 128 may include many different types of applications, including fitness applications, health applications, content streaming applications (including both video and audio streaming applications), gaming applications, productivity applications (such as email applications, calendar applications, spreadsheet applications, word processing applications, presentation applications, etc.), content viewing applications (such as web browsing applications, image viewing applications, etc.), communication applications (such as texting applications, telephone applications, etc.), weather applications, etc. Smartwatch 102 may maintain a list of acceptable types of applications that are commonly employed (or, in some instances, identified via learning with respect to past user casting behavior) for casting content to available outputs 132.

In the context of acceptable application types, smartwatch 102 (possibly in conjunction with or by way of smartphone 104) may apply machine learning based on a context in which smartwatch 102 and/or smartphone 104 operate to better identify the acceptable application types for different operating contexts (which may be based on location, time of day, day of week, time of year, etc.) to maintain separate contextual specific lists of acceptable application types. Smartwatch 102 may only invoke proximity detection device 126 when executing one of applications 128 having a type that is specified in the list of acceptable application types (possibly associated with the current operating context of smartwatch 102).

Using this type for source application 128, smartwatch 102 may better assess whether application 128 is likely to transmit (or, in other words, "cast") content to the available outputs 132. Responsive to determining that the type of source application 128 corresponds to an acceptable type for casting content to available outputs 132, smartwatch 102 may perform the proximity determination noted above for each of available outputs 132. Responsive to determining that the type of source application 128 does not correspond to an acceptable type for casting content to available outputs 132, smartwatch 102 may refrain from performing the proximity determination noted above for each of available outputs 132 so as to avoid potentially unnecessary power consumption.

In this way, various aspects of the techniques may improve operation of smartwatch 102 itself. By presenting ranked list 134 of available outputs 132 premised upon available output proximity, smartwatch 102 may enable users to more efficiently identify one or more available outputs 132 without having to scroll the interface and possibly reduce incorrect selection of available outputs 132. Avoiding scrolling operations and possible incorrect selection of available outputs 132 may reduce consumption of computing resources of smartwatch 102, such as processor cycles, bus bandwidth, memory, etc. and associated power consumption. By only performing available output proximity determination for acceptable types of applications 128, smartwatch 102 may preserve such computing resources in instances where it is unlikely that content will be cast.

In addition, by incorporating ranked list 134 into smartwatch 102 (or, more specifically, into the operating system executed by smartwatch 102), smartwatch 102 may better unify the experience between smartwatch 102 and smartphone 104. That is, smartwatch 102 may present a universal media object (UMO) that facilitates control of media output by smartwatch 102 that is more consistent with how media objects are controlled via smartphone 104. Although more unified, the UMO is not exactly the same as the UMO presented by smartphone 104 due to limitations of smartwatch 102 (e.g., smaller screen, less power storage, etc. compared to smartphone 104). These similarities and distinctions between the UMO exposed by smartwatch 102 and the UMO exposed by smartphone 104 are discussed in more detail with respect to the examples shown in FIGS. 6-9.

Throughout the disclosure, examples are described where a computing system (e.g., a server, etc.) and/or computing device (e.g., a wearable computing device, etc.) may analyze information (e.g., locations, speeds, accelerations, orientations, etc.) associated with the computing system and/or computing device, only if the computing system and/or computing device receives permission from a user (e.g., a person wearing a wearable computing device) to analyze the information.

For example, in situations discussed below in which the mobile computing device may collect or may make use of information associated with the user and the computing system and/or computing device, the user may be provided with an opportunity to provide input to control whether programs or features of the computing system and/or computing device can collect and make use of user information (e.g., information about a user's e-mail, a user's social network, social actions or activities, profession, a user's preferences, or a user's past and current location), or to dictate whether and/or how to the computing system and/or computing device may receive content that may be relevant to the user.

In addition, certain data may be treated in one or more ways before it is stored or used by the computing system and/or computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or computing device.

Figure 2:
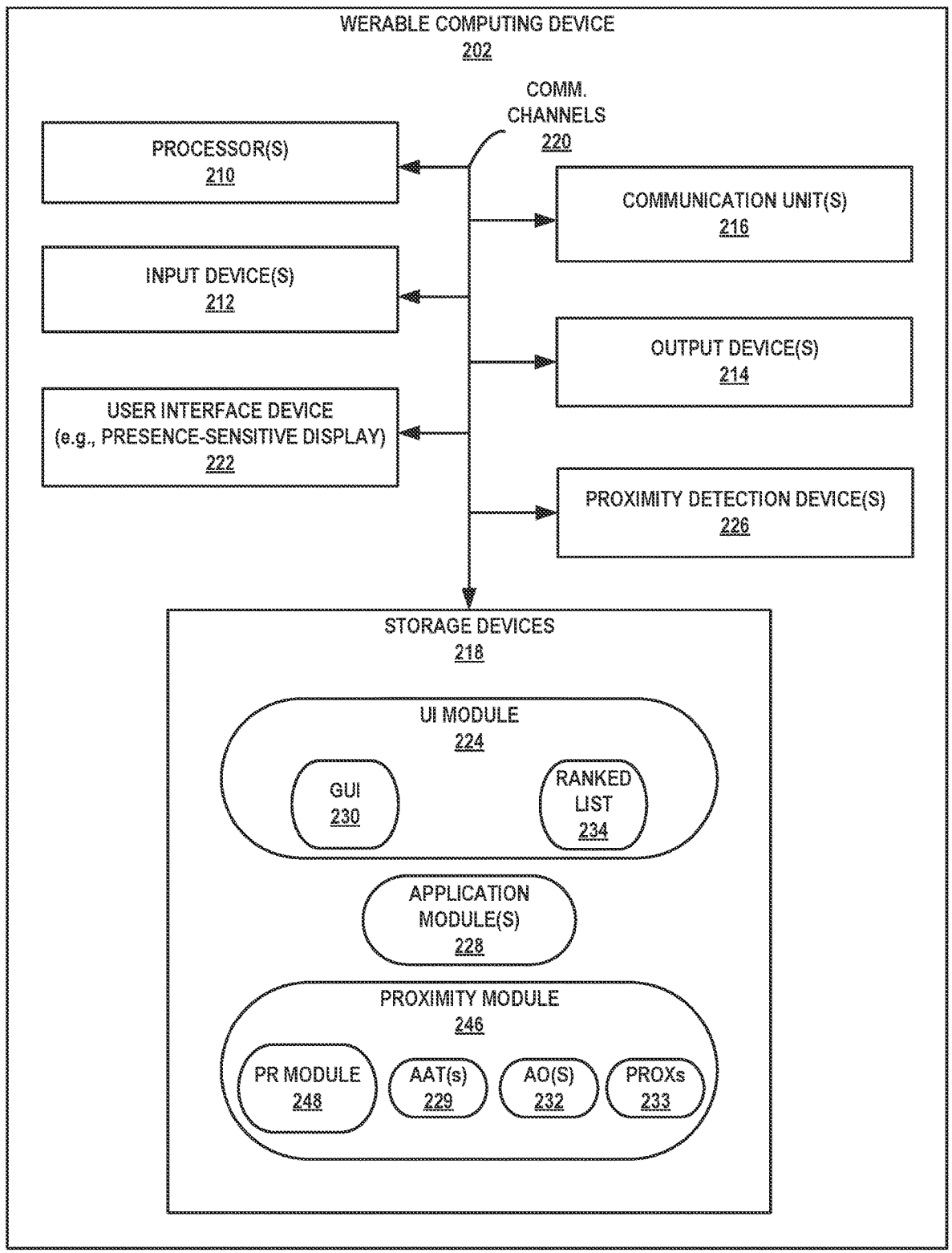
FIG. 2 is a block diagram illustrating an example wearable device configured to perform various aspects of the proximity-based output selection techniques described in this disclosure.

FIG. 2 is a block diagram illustrating an example wearable device configured to perform various aspects of the proximity-based output selection techniques described in this disclosure. In the example of FIG. 2, wearable computing device 202 represents an example of wearable computing device 102 and is described below within the context of system 100 shown in the example of FIG. 1. While wearable computing device 202 illustrates only one particular example of wearable computing device 102 of system 100, many other examples of wearable computing device 202 may be used in other instances and may include a subset of the components included in example wearable computing device 202 or may include additional components not shown in the example of FIG. 2.

Wearable computing device 202 includes one or more processors 210, one or more input devices 212, one or more output devices 214, one or more communication units 216, and one or more storage devices 218, user interface device 222 ("UID 222"), and one or more proximity detection devices 226. Communication channels 220 may interconnect each of the components 210, 212, 214, 216, 218, 222, and 226 for inter-component communications (physically, communicatively, and/or operatively). In some examples, communication channels 220 may include a system bus, a network connection, an inter-process communication data structure, or any other configuration for communicating data.

Processors 210 may represent processing circuitry that implements functionality, either by way of discrete hardware logic or through execution of software as discussed in more detail below. Processors 210 may include a microprocessor, a controller, a digital signal processor (DSP), a central processing unit (CPU), a graphics processing unit (GPU), an application specific integrated circuit (ASIC), a field-programmable gate array (FPGA), or equivalent discrete or integrated logic circuitry. The functions attributed to processors 210 in this disclosure may be embodied as software (as noted herein), firmware, hardware and combinations thereof.

One or more input devices 212 of wearable computing device 202 may receive input. Examples of input are tactile, audio, and video input. Input devices 212 of wearable computing device 202, in one example, includes a presence-sensitive display, touch-sensitive screen, mouse, keyboard, voice responsive system, video camera, microphone or any other type of device for detecting input from a human or machine.

One or more output devices 214 of wearable computing device 202 may generate output. Examples of output are tactile, audio, and video output. Output devices 214 of wearable computing device 202, in one example, includes a presence-sensitive display, sound card, video graphics adapter card, speaker, cathode ray tube (CRT) monitor, liquid crystal display (LCD), light emitting diode (LED) display, organic LED (OLED), or any other type of device for generating output to a human or machine.

One or more communication units 216 of wearable computing device 202 may communicate with external devices (e.g., smartphone 104, media ecosystem devices 106, etc.) via one or more networks, such as network 108, by transmitting and/or receiving network signals on network 108. For example, wearable computing device 202 may invoke communication unit 216 to send and receive data to and/or from network 108 as well as directly via a PAN or other direct communication protocol. Wearable computing device 202 may invoke communication unit 216 to transmit and/or receive radio signals on a radio network such as a cellular radio network, a WLAN, a PAN, etc. Likewise, communication units 216 may transmit and/or receive satellite signals on a satellite network such as a global positioning system (GPS) network. Examples of communication unit 216 include a network interface card (e.g. such as an Ethernet card), an optical transceiver, a radio frequency transceiver, a GPS receiver, or any other type of device that can send and/or receive information. Other examples of communication units 216 may include short wave radios, cellular data radios, wireless Ethernet network radios, as well as universal serial bus (USB) controllers.

One or more storage devices 218 may store information for processing during operation of wearable computing device 202. In some examples, storage device 218 is a temporary memory, meaning that a primary purpose of storage device 218 is not long-term storage. Storage devices 218 may be configured for short-term storage of information as volatile memory and therefore not retain stored contents if powered off. Examples of volatile memories include random access memories (RAM), dynamic random access memories (DRAM), static random access memories (SRAM), and other forms of volatile memories.

Storage devices 218, in some examples, also include one or more computer-readable storage media (which may also be referred to as non-transitory computer-readable storage media). Storage devices 218 may be configured to store larger amounts of information than volatile memory. Storage devices 218 may further be configured for long-term storage of information as non-volatile memory space and retain information after power on/off cycles. Examples of non-volatile memories include magnetic hard discs, optical discs, floppy discs, flash memories, solid state disk (SSD) drives, or forms of electrically programmable memories (EPROM) or electrically erasable and programmable (EEPROM) memories.

Storage devices 218 may store program instructions and/or data associated with various modules, such as a UI module 224, one or more application modules 228 ("application module(s) 228"), and proximity module 246. UI module 224 may represent an example of UI module 124 shown in the example of FIG. 1. UI module 124 is described above as performing some aspect of proximity module 246, where UI module 124 may generate GUI 130 to include a proximity-based ranked list 134 of available outputs 132 after first having ranked available outputs 132 according to a determined proximity from smartwatch 102 to each of available outputs 132.

In this example, UI module 224 may be configured to interface (via an API) with proximity module 246 to determine a ranked list 234 of one or more available outputs (AO(s)) 232. Proximity module 246 may represent a module configured to determine proximities 233 ("PROXs 233") for AOs 232 and then arrange AOs 232, based on proximities 233 to generate ranked list 234. Proximity module 246 may output ranked list 234 to UI module 224, which may generate GUI 230 to include at least a portion of ranked list 234.

Applications 228 may represent an example of application 128 shown in the example of FIG. 1. As noted above, applications 228 may correspond to many different types, such as messaging, health, fitness, content streaming, productivity, lifestyle, home automation control, remote control, camera, etc.

One or more processors 210 may implement functionality and/or execute instructions within wearable computing device 202. For example, processors 210 on wearable computing device 202 may receive and execute instructions stored by storage devices 218 that execute the functionality of UI module 224, application modules 228, and proximity module 246. These instructions executed by processors 210 may cause wearable computing device 202 to store information, within storage devices 218 during program execution. Processors 210 may execute instructions (also referred to as code and/or program code) represented by modules 224, 228, and 246 to cause wearable computing device 202 to execute an operation when a person wearing computing device 202 is controlling a media ecosystem, such as media ecosystem 110.

In some examples, UID 222 of wearable computing device 202 may include functionality of input devices 212 and/or output devices 214. In the example of FIG. 2, UID 222 may be or may include a presence-sensitive input device. In some examples, a presence sensitive input device may detect an object at and/or near a screen. In one example, a presence-sensitive input device of UID 222 may detect an object, such as a finger, stylus, or other implement that is within 2 inches or less of the display (which may also be referred to as a screen). The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques.

In some examples, presence sensitive input device also provides output to a user using tactile, audio, or video stimuli as described with respect to output device 214, e.g., at a display. UI module 224 may cause UID 222 to present a graphical user interface, such as GUI 230. Said differently, UI module 224 may cause UID 222 to output a graphical user interface, such as GUI 230, for display at a screen of a display device.

While illustrated as an internal component of wearable computing device 202, UID 222 also represents and external component that shares a data path with wearable computing device 202 for transmitting and/or receiving input and output. For instance, in one example, UID 222 represents a built-in component of wearable computing device 202 located within and physically connected to the external packaging of wearable computing device 202 (e.g., a screen and/or display on smartwatch). In another example, UID 222 represents an external component of wearable computing device 202 located outside and physically separated from the packaging of wearable computing device 202 (e.g., a monitor, a projector, etc. that shares a wired and/or wireless data path with a tablet computer).

In accordance with techniques of this disclosure, wearable computing device 202 (which is assumed, for purposes of illustration, to represent a smartwatch, and thus may be referred to as "smartwatch 202") may receive, via input devices 212 and/or UID 222, an indication to initiate execution of one of application modules 228 (which may be referred to as "applications 228"). Processors 210 may, responsive to receiving the indication to initiate execution of one of applications 228, invoke proximity module 246.

When invoking proximity module 246, processors 210 may pass available outputs 232, which processor may obtain via interactions with communication units 216 (or if already determined and stored, via storage device 218). Alternatively, proximity module 246 may interface with communication units 216 to identify available outputs 232. Regardless, proximity module 246 may obtain available outputs 232.

In some examples, smartwatch 202 may determine whether smartphone 104 is connected to smartwatch 202. When smartphone 104 is connected to smartwatch 202, smartwatch 202 may interface with smartphone 104 to obtain available outputs 232 (e.g., in a manner similar to processors 210 and/or proximity module 246 described above). Smartwatch 202 may interface with smartphone 104 to obtain available outputs 232 to potentially conserve power consumption given that smartwatch 202 may have limited power storage compared to smartphone 104 (given that wearable computing device 102 is smaller physically compared to smartphone 104 or/and has limited weight constraints to facilitate wearability compared to smartphone 104). When smartwatch 202 determines that smartphone 104 is not connected to smartwatch 202 (e.g., smartphone 104 is out of connectivity range to smartwatch 202), smartwatch 202 itself may determine available outputs 232.

When smartphone 104 is connected to smartwatch 202, proximity module 246 may interface with smartphone 104 to determine an approximate proximity from smartwatch 202 to each of available outputs 232 given again that smartphone 104 may have increased power capacity compared to smartwatch 202. Whether smartwatch 202 or smartphone 104 determines proximities 233 may depend on how smartwatch 202 is currently connected to smartphone 104.

For example, when proximity module 246 determines that smartphone 104 is connected to smartwatch 202 via only a WLAN connection, proximity module 246 may determine that smartphone 104 is unable to accurately identify proximities 233 given that the WLAN connection may not provide sufficient resolution for accurate proximity detection (as, for example, WLAN connections may span several, if not all, rooms in a building). When proximity module 246 determines that smartphone 104 is connected to smartwatch 202 via only a PAN connection or via both a PAN connection and a WLAN connection, proximity module 246 may determine that the PAN connection provides sufficient accuracy for approximating proximities 233 from smartwatch 202 to each of available outputs 232.

When smartwatch 202 determines that smartphone 104 is not connected to smartwatch 202, proximity module 246 may itself determine proximities 233 from smartwatch 202 to each of available outputs 232. In this instance, proximity module 246 may interface with communication units 216 to determine a RTT (via, e.g., a ping) from communication units 216 of smartwatch 202 to each of available outputs 232. Proximities 233 may represent this RTT in this example.

As noted above, however, proximity module 246 may not always determine proximities 233 upon determining that smartphone 104 is not connected to smartwatch 202 (or when smartwatch 202 is not connected to smartphone 104 via the PAN connection). Proximity module 246 may, in some instances, determine a type of applications 228 being initiated for execution. Proximity module 246 may determine this type via processors 210 passing the type of applications 228 being initiated for execution when invoking proximity module 246.

In any event, proximity module 246 may obtain the type of the one of applications 228 and compare the type of the one of applications 228 being initiated for execution to acceptable application types (AAT(s)) 229 ("AAT(s) 229"). When the type of the one of applications 228 is not included in AATs 229, proximity module 246 may refrain from determining proximities 233 given that certain application types are not commonly used for casting content (such as messaging applications). In this instance, the user may interface with the one of applications 228 to initiate casting without proximity based ranking of available outputs 232 (or possibly with proximity based ranking of available outputs 232 when configured via settings or after selecting casting of the one of applications 228). When the type of the one of the applications 228 is included in AATs 229, proximity module 246 may determine proximities 233 for each of available outputs 232.

Responsive to determining proximities 233 for available outputs 232, proximity module 246 may invoke proximity ranking (PR) module 248 ("PR module 248"), passing available outputs 232 and proximities 233 to PR module 248 for ranking available outputs 232 based on proximities 233. As one example, PR module 248 may order available outputs 232 based on proximities 233 for each of available outputs 232 from closest proximity of proximities 233 to farthest proximity of proximities 233 to obtain ranked list 234 of available outputs 232. Responsive to generating ranked list 234, PR module 248 may return (e.g., via a pointer) ranked list 234 to processors 210.

Responsive to receiving ranked list 234, processors 210 may invoke UI module 224 (e.g., via an API), passing (e.g., via a pointer) ranked list 234 to UI module 224. Responsive to receiving ranked list 234, UI module 224 may generate GUI 230 based on ranked list 234. UI module 224 may interface with UID 222 to present at least a portion of GUI 230 that includes (likely some viewable portion) of ranked list 234. UID 222 may display the portion of GUI 230.

Figure 3:
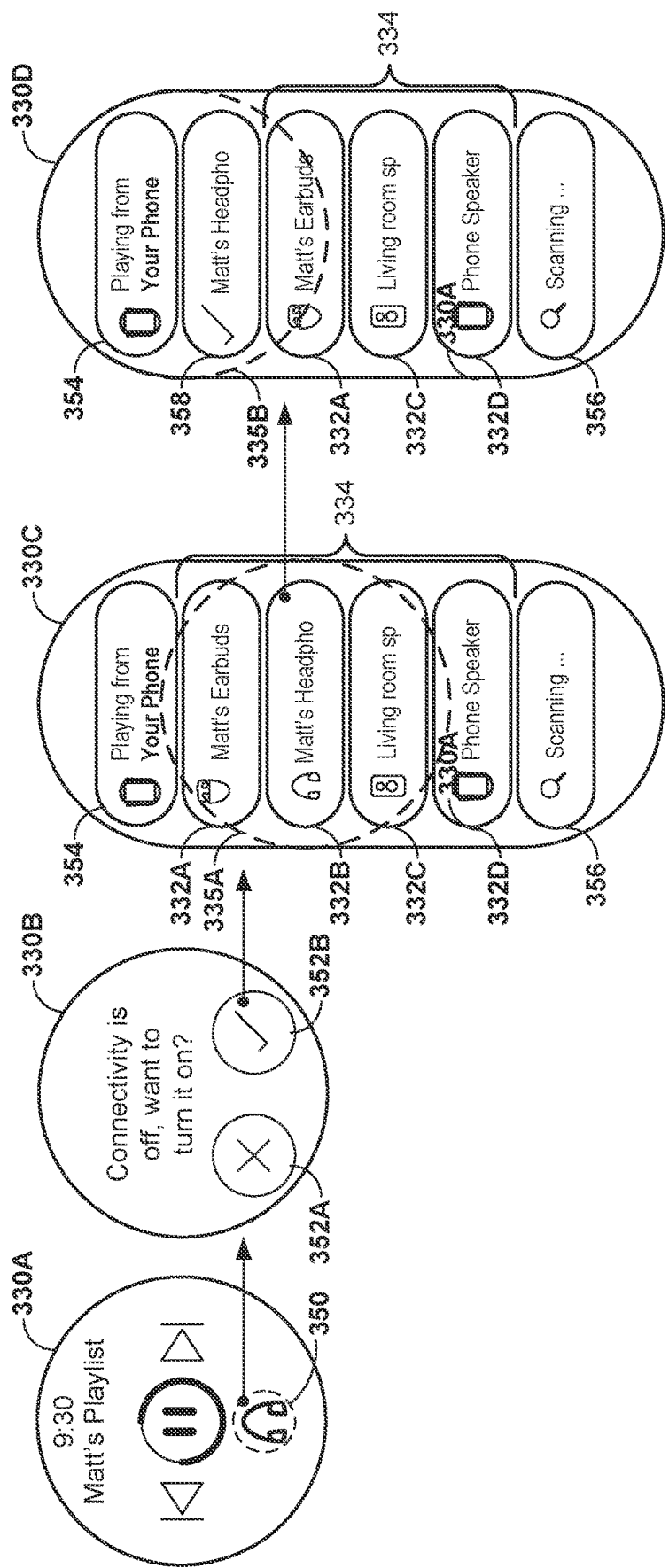
FIG. 3 is a diagram illustrating an example progression of a graphical user interface presented in accordance with various aspects of the proximity-based output selection techniques described in this disclosure.

FIG. 3 is a diagram illustrating an example progression of a graphical user interface presented in accordance with various aspects of the proximity-based output selection techniques described in this disclosure. UID 222 of smartwatch 202 (shown in the example of FIG. 2) first presents GUI 330A, which UI module 224 presents upon initiating execution of a content streaming application 228. GUI 330A includes a connectivity icon 350, which the user selects to transition from GUI 330A to GUI 330B.

Responsive to the user selecting connectivity icon 350, UID 222 may invoke UI module 224, which processes selection of connectivity icon 350 to generate GUI 330B that informs the user that "Connectivity is off" asking the user whether the users "want[s] to turn it on?" UI module 224 may interface with communication units 216 (or the underlying operating system, which maintains a connectivity status for communication units 216). Responsive to the connectivity status for communication units 216 indicating that connectivity has been turned off (e.g., when smartwatch 202 is in airplane mode, or when the user has manually turned off connectivity), UI module 224 may generate GUI 330B and interface with UID 222 to display GUI 330B. Responsive to the connectivity status for communication units 216 indicating that connectivity is disabled, UI module 224 may refrain from generating GUI 330B.

GUI 330B includes a decline icon 352A (with an "X") and an accept icon 352B (with a checkmark). Responsive to an indication that the user has selected decline icon 352A, UI module 224 may present GUI 330A and interface with UID 222 to present GUI 330A, effectively returning to the previous state. Responsive to an indication that the user has selected accept icon 352B, UI module 224 may generate GUI 330C, and interface with UID 320 to display at least a portion of GUI 330C (which is shown by exposed GUI display 335A (which is updated to indicate that the user has scrolled the portion of exposed GUI display 335A down).

GUI 330C may represent an example of GUI 130 and/or 230. GUI 330C may include a graphical element 354 indicating a source providing the content (as denoted by the example text stating "Playing from Your Phone"). UI module 224 may determine (in some instances, receive or otherwise obtain) the current source when being invoked by processors 210 and update GUI 330C to present the source above ranked list 334 of active outputs 332A-332D ("available outputs 332") that have been determined according to various aspects of the proximity based output selection techniques described in this disclosure.

GUI 330C also includes a scanning graphical element 356 representative of a scanning operation to scan for additional and/or new available outputs 332. Responsive to an indication that the user has selected scanning graphical element 356, UI module 224 may interface with communication units 316 to initiate a new scan for available outputs 332 not included in available outputs 332A-332D. While not shown in the example of FIG. 3, the user may establish a connection with new available output 332 (e.g., by entering a pairing code, entering a password and username, etc.) and interface with UID 222 to update GUI 330C to include new available output 332 (e.g., as available output 332E), which may possibly be ranked according to various aspects of the proximity based output selection techniques described in this disclosure and inserted into ranked list 134 according to a proximity 333 determined for new available output 332E.

Responsive to an indication that the user has selected available output 332B, UI module 224 may generate GUI 330D. GUI 330D may reset exposed GUI display 335A to exposed GUI display 335B. UI module 224 may generate GUI 330D to indicate that available output 332B is a current output, which is represented by a current output graphical element 358 having a checkmark icon indicating that available output 332B is the current output. UI module 224 may remove available output 332B from ranked list 134, specifying current output graphical element 358 above ranked list 134 (but below current source graphical element 354 although other arrangements are within the scope of the proximity based output selection techniques described in this disclosure). UI module 224 may interface with UID 222 to present GUI 330D before transitioning (possibly after some period of time) back to GUI 330A.

Figure 4:
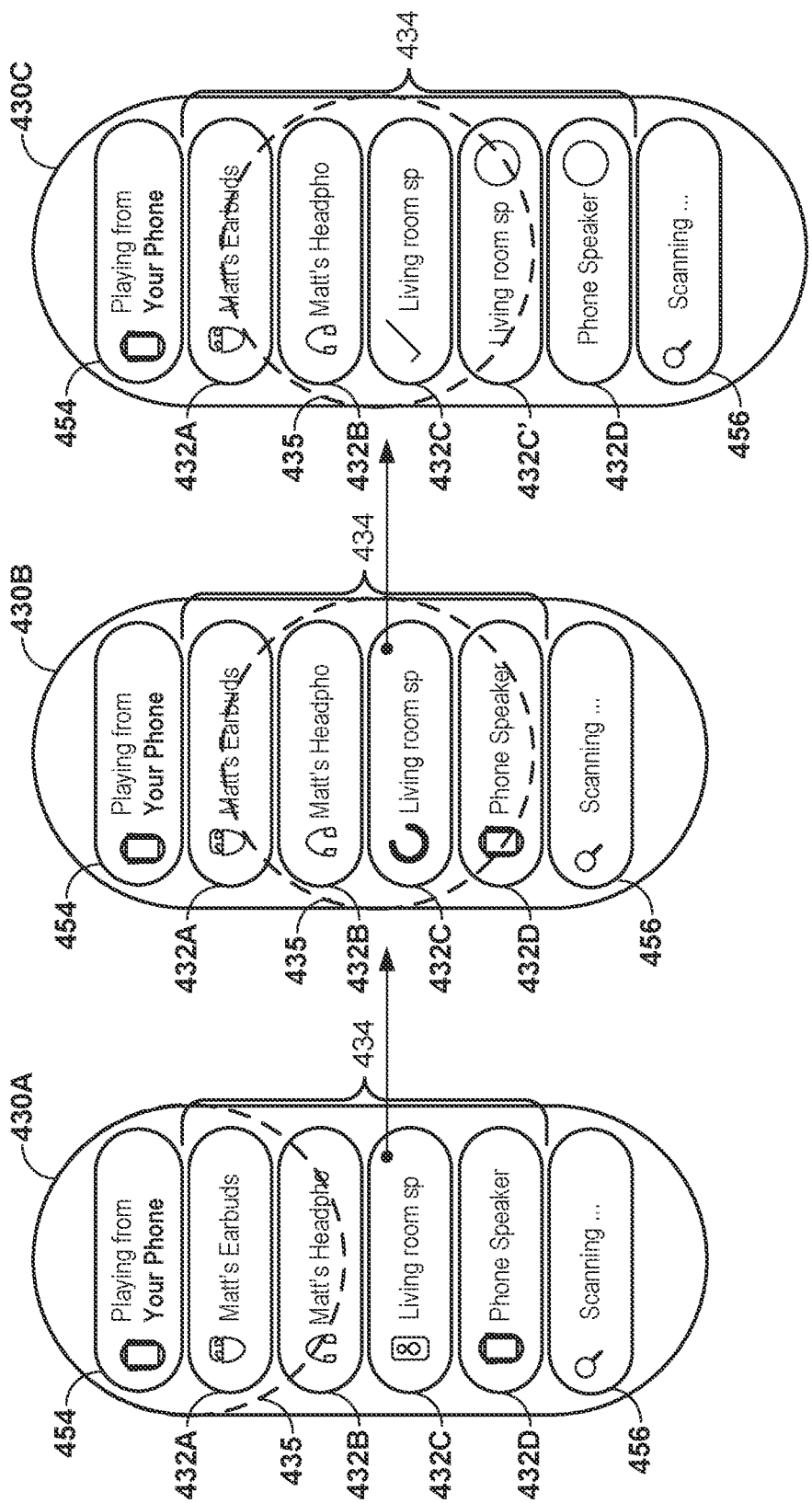
FIG. 4 is another diagram illustrating an example progression of a graphical user interface presented in accordance with various aspects of the proximity-based output selection techniques described in this disclosure.

FIG. 4 is another diagram illustrating an example progression of a graphical user interface presented in accordance with various aspects of the proximity-based output selection techniques described in this disclosure. UID 222 of smartwatch 202 (shown in the example of FIG. 2) first presents GUI 430A, which UI module 224 presents responsive to an indication the user has selected a connectivity icon similar to connectivity icon 350 (and assuming connectivity is turned on as described above with respect to the example of FIG. 3) presented by a user interface similar to user interface 330A.

In the example of FIG. 4, GUI 430A, from top to bottom, includes a source graphical icon 454 (which is similar to source graphical icon 354), ranked list 434 (which is similar to ranked list 334) including available outputs 432A-432D (similar to available outputs 332A-332D), and a scanning graphical element 456 (similar to scanning graphical element 356). Responsive to an indication that the user has selected available output 432C, UI module 224 may generate GUI 430B, which updates an icon of available output 432C to indicate that smartwatch 202 is connecting to available output 432C.

UI module 224 may transition (possibly after some period of time or after successfully connecting to selected available output 432C) to a GUI 430C. UI module 224 may generate GUI 430C based on a type of available output selected by the user. Certain types of available outputs (such as speakers, smartphones, A/V receivers, smart televisions, smart speakers, headphones, earbuds, etc.) may allow for grouping of available outputs such that the source may cast to multiple different available outputs. UI module 224 may dynamically identify which of available outputs 432 based on past user selection of grouped available outputs. In some instances, UI module 224 may determine which of available outputs 432 to indicate as being available for grouping based on a configuration entered by the user in smartphone 104 or other devices, including smartwatch 202.

In any event, UI module 224 may update GUI 430C to indicate that smartwatch 202 has successfully connected to available output 432C (as indicated, for example, by a checkmark icon as shown in the example of FIG. 4 for available output 432C). UI module 224 may also add an adapted available output 432C' to indication that available output 432C is available for grouping, while also updating available output 432D to indicate that smartphone 104 is available for grouping (both updates of which now include a circle icon to signify grouping). Responsive to an indication that the user has selected one or more of available output 432C' and available output 432D, UI module 224 may update each selected one of available outputs 432C' and available output 432D to fill in the circle with a template color that fits a color template associated with GUI 430C. GUI 430C may, in this way, allow the user to dynamically group available outputs 432 to individually receive a cast from source 454 and coordinate playback among the grouped available outputs.

Figure 5:
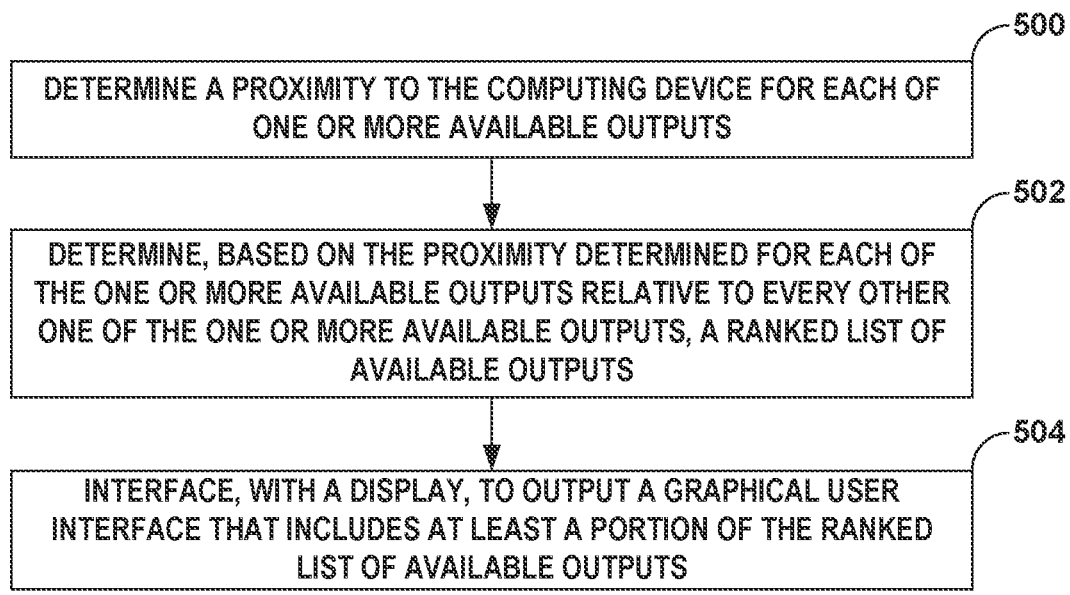
FIG. 5 is a flowchart illustrating example operation of a wearable computing device in performing various aspects of the proximity-based output selection techniques described in this disclosure.

FIG. 5 is a flowchart illustrating example operation of a wearable computing device in performing various aspects of the proximity-based output selection techniques described in this disclosure. Smartwatch 102 or another computing device (such as smartphone 104) may include a proximity detection device 126 may determine a proximity from smartwatch 102 to each of one or more available outputs (which as noted above may include smartwatch 102, smartphone 104, and/or media ecosystem devices 106) (500). Proximity detection device 126 may include an interface, such as a network interface, by which to determine a round trip time (RTT), such as by way of a so-called network ping, between smartwatch 102 and available outputs 132 that are graphical representations of one or more of smartwatch 102, smartphone 104, and/or media ecosystem devices 106.

Alternatively or in conjunction with the network interface, proximity detection device 126 may represent a PAN interface (which is one example of a network interface) by which to communicate pings or other packets capable of determining a RTT between smartwatch 102 and available outputs 132. Further, proximity detection device 126 may represent, either in conjunction with or as an alternative to the above examples, a radar detection device, a camera, and/or any other sensors capable of determining either via radar, image inspection, etc. a proximity from smartwatch 102 and available outputs 132. Proximity refers to an approximate distance between smartwatch 102 and available outputs 132 (which may be represented as a time or other unit of measure and not necessarily in terms of a measure of distance).

Proximity detection device 126 may pass (e.g., via pointer) each proximity (e.g., which may be defined in a table, a list, and or other data structure capable of storing the proximities) to UI module 124. UI module 124 may be configured to determine, based on the proximity from smartwatch 102 to each of available outputs 132, a ranked list of available outputs 132 (502), where such list is denoted as list 134 in the example of FIG. 1. UI module 124 may arrange available outputs 132 in list 134 from closest proximity from smartwatch 102 to farthest proximity from smartwatch 102 (where the arrow on far left of FIG. 1 denotes this closest to farthest proximity ranking). UI module 124 may next interface, with a display represented in this example by user interface device 122, to output GUI 130 that includes at least a portion (shown as exposed GUI display 135 in the example of FIG. 1) of ranked list 134 of available outputs 132 (504).

Figure 6:
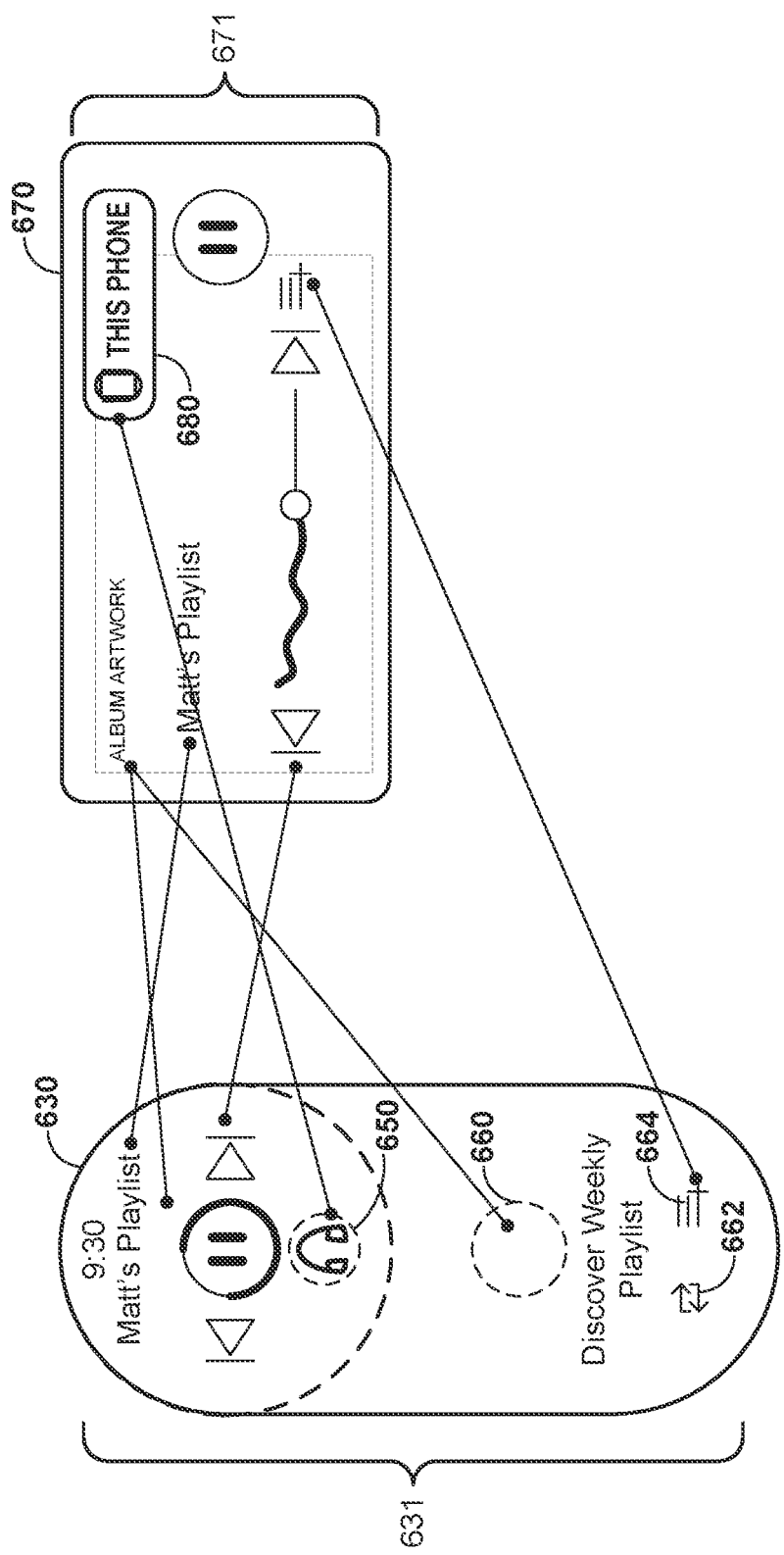
FIG. 6 is a conceptual diagram illustrating a universal media object (UMO) presented by the smartwatch shown in FIG. 1 in accordance with various aspects of the techniques described in this disclosure compared to the universal media object (UMO) presented by the smartphone shown in FIG. 1

FIG. 6 is a conceptual diagram illustrating a universal media object (UMO) presented by the smartwatch shown in FIG. 1 in accordance with various aspects of the techniques described in this disclosure compared to the universal media object (UMO) presented by the smartphone shown in FIG. 1. In the example of FIG. 6, smartwatch 102 may present a graphical user interface (GUI) 630 ("GUI 630") that includes a universal media object (UMO), which provides a way by which to control media playback across devices whether media playback was initiated from smartwatch 102, smartphone 104, or any other device (e.g., a laptop computer, a desktop computer, a smart speaker, smartglasses, etc.) in the media ecosystem, such as media ecosystem 110.

GUI 630 may represent an example of GUI 330 that is scrollable to reveal so-called second actions. The dashed circle represents what is currently being presented on the display of smartwatch 102, where graphical elements 660-664 are not presently being displayed by the display of smartwatch 102.

Also shown in the example of FIG. 6 is a GUI 670 (in this instance a widget) presented by the display of smartphone 104 that includes a UMO for controlling playback by media content across devices similar to the UMO presented by smartwatch 102. The UMO for smartwatch 102 may be denoted UMO 631 while the UMO for smartphone 104 may be denoted UMO 671.

UMO 631 is similar to, but different from, UMO 671. UMO 631 includes the same media controls (e.g., stop, play, pause, next, and back) as UMO 671 although arranged in a different manner to better accommodate the smaller (and, in this instance, differently shaped) display of smartwatch 102 compared to the larger (and, in this instance, differently shaped) display of smartphone 104. UMO 631 also includes a connectivity icon 650 (which may expose, when selected, the list of outputs available for media playback as described above, where such list of available outputs may be referred to as an "output selector" or "output switcher"). UMO 671 likewise includes a connectivity icon 680 that also exposes the output selector but includes additional text given the larger display.

In each instance, the media playback controls, connectivity icons 650 and 680, and the general background colors may adhere to a common cohesive font type, color scheme, graphical template, etc. In some instances, UMO 671 includes album artwork or other images (e.g., artist image, lyrics, etc.), while such artwork or other images are omitted by UMO 631 to limit battery/power consumption given that displaying complicated artwork for long durations may consume significant power. UMO 631 may however incorporate tones or colors from the artwork or other images into media controls, a background of UMO 631, etc. UMO 631 may also present a portion of the artwork or any images in graphical element 660, which may have a limited duration (e.g., only stays visible for 5 seconds) to avoid unnecessary consumption of power/battery. Graphical elements 662 may enable repeat play of media content, while graphical element 664 may add currently playing media content to a playlist.

In this way, UMO 631 may nearly reproduce the experience provided by UMO 671, but with accommodations that facilitate extended use in the context of power limited devices, such as smartwatch 102, compared to larger devices, such as smartphone 104. Given that smartwatch 102 is worn (and likely on the user more extensively than smartphone 104), UMO 631 may represent a more convenient way to control media playback, especially considering that UMO 631 is not limited to only controlling media playback initiated at smartwatch 102, but across the entire media ecosystem.

Figure 7:
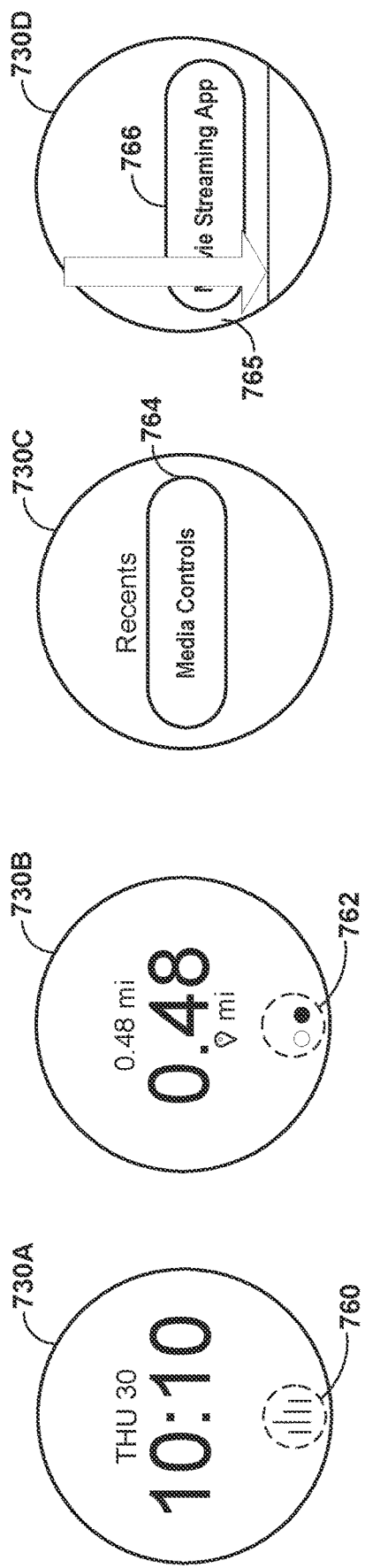
FIG. 7 is another conceptual diagram illustrating various ways to invoke the UMO in accordance with various aspects of the techniques described in this disclosure.

FIG. 7 is another conceptual diagram illustrating various ways to invoke the UMO in accordance with various aspects of the techniques described in this disclosure. As shown in the example of FIG. 7, smartwatch 102 may represent a number of different GUIs 730A-730D, each of which may expose a different way to access the UMO.

GUI 730A may include a graphical element 760 depicting that music or other audio content is playing (e.g., an equalizer bar). Upon receiving an input selecting graphical element 760, smartwatch 102 may expose the UMO, such as UMO 631 shown in the example of FIG. 6.

GUI 730B may include a graphical element 762 indicating that, while working out or otherwise performing activity tracking, the user may swipe from right to left to expose the UMO (e.g., the grey dot denotes that the UMO is to the right). Responsive to receiving a swipe gesture from right to left, smartwatch 102 may present or otherwise expose the UMO.

GUI 730C may represent a way to reach a "Media Controls" application via graphical element 764, which is presented responsive to receiving an indication that the user has double tapped the display of smartwatch 102 (and/or possibly double clicked a button of smartwatch 102). Responsive to receiving an input from the user selecting graphical element 764, smartwatch 102 may expose the UMO.

GUI 730D may include a shade element 765 that the user may select via a swipe down gesture to expose quick settings (e.g., display brightness, auto-dimming, flashlight mode, volume, mute, etc.). Within shade element 765, GUI 730D may include graphical element 766 that allows you to select an application that is currently playing media content. Responsive to receiving an indication that the user selected graphical element 766, smartwatch 102 may expose the UMO.

Figure 8:
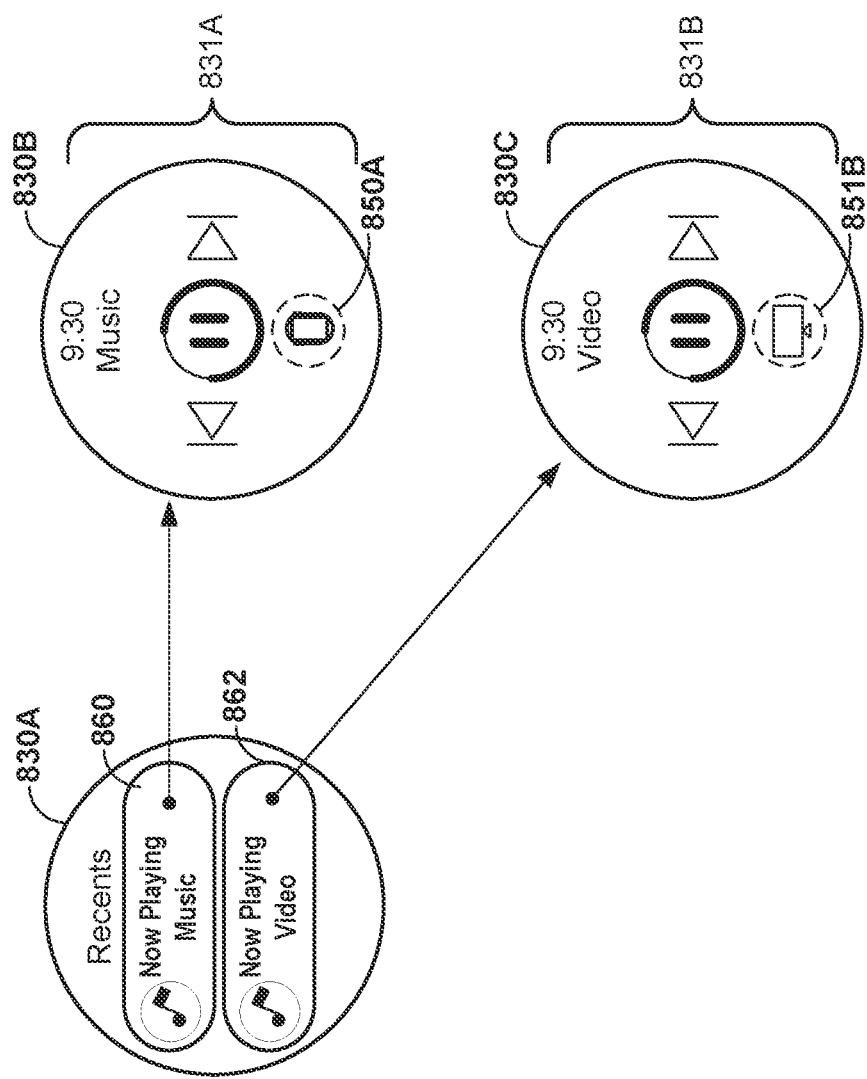
FIG. 8 is a conceptual diagram illustrating example graphical user interfaces presented by the smartwatch shown in FIG. 1 for controlling two or more cast sessions via the UMO in accordance with various aspects of the techniques described in this disclosure.

FIG. 8 is a conceptual diagram illustrating example graphical user interfaces presented by the smartwatch shown in FIG. 1 for controlling two or more cast sessions via the UMO in accordance with various aspects of the techniques described in this disclosure. As shown in the example of FIG. 8, a GUI 830A may show recent applications ("Recents") that are still currently playing media as graphical elements 860 and 862. Graphical elements 860 and 862 each include a status element (i.e., a music note in the example of FIG. 8) indicating that the corresponding sources are each playing media content on a device within the media ecosystem. Graphical element 860 indicates that music is "Now Playing" while graphical element 862 indicates that video is "Now Playing."

Responsive to receiving an indication that the user has selected graphical element 860, GUI 830A transitions to GUI 830B, which presents or otherwise exposes a UMO 831A for controlling music playback, including a connectivity icon 850A for accessing the output switcher described above. Responsive to receiving an indication that the user has selected graphical element 862, GUI 830A transitions to GUI 830C, which presents or otherwise exposes a UMO 831B for controlling video playback, including a connectivity icon 850B for accessing the output switcher described above.

Figure 9:
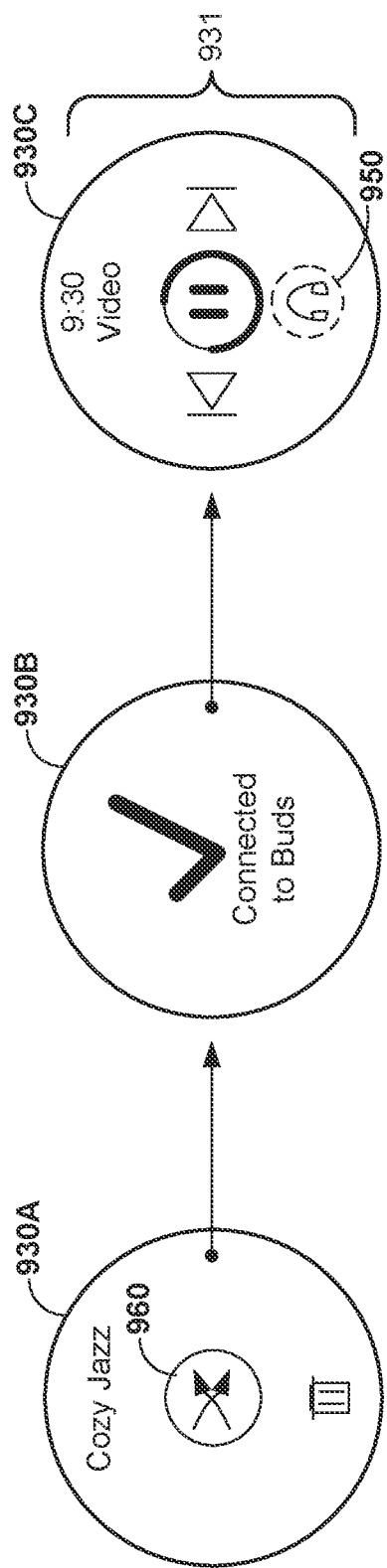
FIG. 9 is a conceptual diagram illustrating example graphical user interfaces for seamless audio switching in support of a universal media output according to various aspects of the techniques described in this disclosure.

FIG. 9 is a conceptual diagram illustrating example graphical user interfaces for seamless audio switching in support of a universal media output according to various aspects of the techniques described in this disclosure. In the example of FIG. 9, GUI 930A may present a graphical element 960 indicating that seamless audio switching has been initiated responsive to initiating playback of media content on smartwatch 102. Seamless audio switching may be configured in the general settings of smartwatch 102 (and/or via a watch application that controls watch settings via smartphone 104).

Seamless audio switching may automatically pair and switch media playback to another device (i.e., ear buds "Buds" in this example, but possibly other devices, such as a smart speaker, smartglasses, headphones, a laptop computer, a tablet computer, a smart display, a smart television, etc.). The settings for seamless audio switching may allow the user to identify the primary device to which media playback should automatically switch to as the output.

Upon connecting to the device (the "Buds" in the example of FIG. 9), GUI 930A may transition to GUI 930B confirming that smartwatch 102 has automatically paired with and established a connection with the "Buds." GUI 930B may, after some duration (e.g., 5 seconds), automatically transition (meaning without any user input or feedback) to GUI 960C that present UMO 931 including a connectivity icon 950 for exposing the output switcher described above in more detail. Connectivity icon 950 includes an image of headphones to denote that media is currently playing from the previously identified "Buds." In some examples, responsive to an indication that the user has selected connectivity icon 950 (or any of the above noted connectivity icons), smartwatch 102 may update GUI 930C to show a top output (e.g., the top ranked output), such as a laptop, without transitioning fully to the output switcher discussed above.

In various combinations of aspects of the techniques described above, the UMO may facilitate a number of different use cases with the UMO primarily being focused on seamless start, easy transitions, simple extensions, always-on controls, and orchestration. Seamless start may refer to the seamless audio switching that arises after starting media and automatically connects to buds (or other worn output), with an example provided by way of FIG. 9. Easy transitions for the UMO may allow the user to start media on smartwatch 102, enter media ecosystem 110, and play on other devices available in media ecosystem 110. Simple extensions for the UMO may allow controlling of media on smartwatch 102, and cast to an output device. Always-on controls for the UMO enable access to media controls for media from smartwatch 102, while orchestration for the UMO enables access to other media elements and control for such other media elements from smartwatch 102.

The UMO described in this disclosure may enable easy transitions that reduce complicated connection searches, connection status verification, available device selection into a sequence of different GUIs, including the output switcher described above with respect to the examples of FIGS. 3 and 4. The UMO provides for simple extensions by maintaining coherence with outputs as presented in the output switcher on smartwatch 102 with outputs presented in the output switcher on smartphone 104. Due to limited display sizes on most smartwatches (including smartwatch 102 in this example), transitions between GUIs supporting UMO may occur automatically (or in response to user inputs selecting, in the example of the output switcher, one or more output devices) to avoid having the user select small graphical elements to finalize a selection.

In terms of use cases, the user may want to listen to media without needing smartphone 104. In this first use case, smartwatch 102 may detect that smartphone 104 is not connected to smartwatch 102 (e.g., via a personal area network—PAN—connection). Smartwatch 102 may receive an indication that the user has selected media playback and, based on determining that smartwatch 102 is not connected to smartphone 104, automatically detect an output (e.g., the "Buds" noted above), and auto switch when starting media playback on smartwatch 102. If seamless audio switching is disabled or not configured/enabled, smartwatch 102 may seamlessly transition, responsive to determining that seamless audio switching is disabled, to the output switcher of the UMO in order to prompt the user to select an available output. Responsive to selecting an available output, smartwatch 102 may transition back to the UMO (from the output switcher interface).

As another use case, the user may want to control where media is being played from smartwatch 102. In this second use case, smartwatch 102 may receive an indication to launch the output switcher (e.g., via connection icon 350). Smartwatch 102 may obtain the list of available outputs, presenting this list for user consideration and selection in the manner described above, before automatically transitioning to the UMO (from the output switcher interface). If the user is unable to locate a preferred device in the output switcher interface, smartwatch 102 may enable the user to search for the preferred device and initiate a connection with the preferred device (along with presenting connection status), before transitioning away from the output switcher interface to the UMO.

In this way, various aspects of the techniques may enable one or more of the following examples.

Example 1. A computing device comprising: one or more network interfaces configured to communicate with one or more available outputs for playing content; and processing circuitry configured to: determine a proximity to the computing device for each of the one or more available outputs; determine, based on the proximity determined for each of the one or more available outputs relative to every other one of the one or more available outputs, a ranked list of available outputs; and interface, with a display, a graphical user interface that includes at least a portion of the ranked list of available outputs.

Example 2. The computing device of example 1, wherein, to determine the proximity to the computing device for each of the one or more available outputs, the processing circuitry is configured to determine, in response to initiating execution of an application, the proximity to the computing device for each of the one or more available outputs.

Example 3. The computing device of example 2, wherein the processing circuitry is further configured to determine whether a companion device is connected to the computing device; and wherein, to determine the proximity to the computing device for each of the one or more available outputs, the processing circuitry is configured to determine, based on the determination that the companion device is not connected to the computing device and initiating execution of the application, the proximity to the computing device for each of the one or more available outputs.

Example 4. The computing device of example 2, wherein the processing circuitry is further configured to determine a type of the application, wherein, to determine the proximity to the computing device for each of the one or more available outputs, the processing circuitry is configured to determine, responsive to the type of the application being an acceptable type for determining the proximity to the computing device for each of the one or more available outputs, the proximity to the computing device for each of the one or more available outputs.

Example 5. The computing device of any combination of examples 1-4, wherein, to determine the proximity to the computing device for each of the one or more available outputs, the processing circuitry is configured to: interface with the one or more network interfaces to determine a round trip time for a data unit sent to each of the one or more available outputs; and determine, based on the round trip times for the data unit sent to each of the one or more available outputs, the proximity to the computing device for each of the one or more available outputs.

Example 6. The computing device of any combination of examples 1-5, wherein, to determine the ranked list of available outputs, the processing circuitry is configured to order the one or more available outputs based on the proximity for each of the one or more available outputs from closest proximity to farthest proximity to obtain the ranked list of available outputs.

Example 7. The computing device of any combination of examples 1-6, wherein the processing circuitry is further configured to: interface with the one or more network interfaces to scan for a new output not included in the one or more available outputs; and add the new output to the one or more available outputs prior to determining the proximity to the computing devices for each of the one or more available outputs.

Example 8. The computing device of any combination of examples 1-7, wherein the processing circuitry is further configured to: determine a current output of the one or more available outputs to which the computing device is currently connected for playing the content; and interface, with the display, to update at least the portion of the graphical user interface to present the current output above the ranked list of available outputs.

Example 9. The computing device of any combination of examples 1-8, wherein the processing circuitry is further configured to: determine a source providing the content; and interface, with the display, to update at least the portion of the graphical user interface to present the source above the ranked list of available outputs.

Example 10. The computing device of any combination of examples 1-9, wherein the one or more interfaces include a wireless local area network interface, a personal area network interface, an ultrawide band interface, and a near field communication interface.

Example 11. The computing device of any combination of examples 1-10, wherein the computing device comprises a wearable computing device.

Example 12. The computing device of example 11, wherein the wearable computing device comprises one of a head-mounted display and a smartwatch.

Example 13. The computing device of any combination of examples 1-12, wherein the one or more available outputs include one or more of headphones, earbuds, a smartphone, a smart speaker, smart glasses, a smart television, an audio/visual receiver, and a smart display.

Example 14. A method comprising: determining, by processing circuitry, a proximity to the computing device for each of one or more available outputs; determining, by the processing circuitry and based on the proximity determined for each of the one or more available outputs relative to every other one of the one or more available outputs, a ranked list of available outputs; and interfacing, by the processing circuitry and with a display, to output a graphical user interface that includes at least a portion of the ranked list of available outputs.

Example 15. The method of example 14, wherein determining the proximity to the computing device for each of the one or more available outputs comprises determining, in response to initiating execution of an application, the proximity to the computing device for each of the one or more available outputs.

Example 16. The method of example 15, further comprising determining whether a companion device is connected to the computing device; and wherein determining the proximity to the computing device for each of the one or more available outputs comprises determining, based on the determination that the companion device is not connected to the computing device and initiating execution of the application, the proximity to the computing device for each of the one or more available outputs.

Example 17. The method of example 15, further comprising determining a type of the application, wherein determining the proximity to the computing device for each of the one or more available outputs comprises determining, responsive to the type of the application being an acceptable type for determining the proximity to the computing device for each of the one or more available outputs, the proximity to the computing device for each of the one or more available outputs.

Example 18. The method of any combination of examples 14-17, wherein determining the proximity to the computing device for each of the one or more available outputs comprises: interfacing with the one or more network interfaces to determine a round trip time for a data unit sent to each of the one or more available outputs; and determining, based on the round trip times for the data unit sent to each of the one or more available outputs, the proximity to the computing device for each of the one or more available outputs.

Example 19. The method of any combination of examples 14-18, wherein determining the ranked list of available outputs comprises ordering the one or more available outputs based on the proximity for each of the one or more available outputs from closest proximity to farthest proximity to obtain the ranked list of available outputs.

Example 20. A non-transitory computer-readable storage medium having instructions stored thereon that, when executed, cause one or more processors of a computing device to: determine a proximity to the computing device for each of one or more available outputs; determine, based on the proximity determined for each of the one or more available outputs relative to every other one of the one or more available outputs, a ranked list of available outputs; and interface, with a display, to output a graphical user interface that includes at least a portion of the ranked list of available outputs.

Example 21. The non-transitory computer-readable storage medium of example 20, wherein the instructions, when executed, cause the one or more processors to determine, in response to initiating execution of an application, the proximity to the computing device for each of the one or more available outputs.

Example 22. The non-transitory computer-readable storage medium of example 21, wherein the instructions further include instructions that, when executed, cause the one or more processors to determine whether a companion device is connected to the computing device; and wherein the instruction that, when executed, cause the one or more processors to determine the proximity to the computing device for each of the one or more available outputs, include instructions that, when executed, cause the one or more processors to determine, based on the determination that the companion device is not connected to the computing device and initiating execution of the application, the proximity to the computing device for each of the one or more available outputs.

Example 23. The non-transitory computer-readable storage medium of example 21, wherein the instructions further include instructions that, when executed, cause the one or more processors to determine a type of the application, wherein the instructions that, when executed cause the one or more processors to determine the proximity to the computing device for each of the one or more available outputs include instructions that, when executed, cause the one or more processors to determine, responsive to the type of the application being an acceptable type for determining the proximity to the computing device for each of the one or more available outputs, the proximity to the computing device for each of the one or more available outputs.

Example 24. The non-transitory computer-readable storage medium of any combination of examples 20-23, wherein the instructions that, when executed, cause the one or more processors to determine the proximity to the computing device for each of the one or more available outputs include instructions that, when executed, cause the one or more processors to: interface with the one or more network interfaces to determine a round trip time for a data unit sent to each of the one or more available outputs; and determine, based on the round trip times for the data unit sent to each of the one or more available outputs, the proximity to the computing device for each of the one or more available outputs.

Example 25. The non-transitory computer-readable storage medium any combination of examples 20-24, wherein the instructions that, when executed, cause the one or more processors to determine the ranked list of available outputs include instructions that, when executed, cause the one or more processors to order the one or more available outputs based on the proximity for each of the one or more available outputs from closest proximity to farthest proximity to obtain the ranked list of available outputs.

Example 26. The non-transitory computer-readable storage medium of any combination of examples 20-25, wherein the instructions further include instructions that, when executed, cause the one or more processors to: interface with the one or more network interfaces to scan for a new output not included in the one or more available outputs; and add the new output to the one or more available outputs prior to determining the proximity to the computing devices for each of the one or more available outputs.

Example 27. The non-transitory computer-readable storage medium of any combination of examples 20-26, wherein the instructions further include instructions that, when executed, cause the one or more processors to: determine a current output of the one or more available outputs to which the computing device is currently connected for playing the content; and interface, with the display, to update at least the portion of the graphical user interface to present the current output above the ranked list of available outputs.

Example 28. The non-transitory computer-readable storage medium of any combination of examples 20-27, wherein the instructions further include instructions that, when executed, cause the one or more processors to: determine a source providing the content; and interface, with the display, to update at least the portion of the graphical user interface to present the source above the ranked list of available outputs.

Example 29. The non-transitory computer-readable storage medium of any combination of examples 20-28, wherein the one or more interfaces include a wireless local area network interface, a personal area network interface, an ultrawide band interface, and a near field communication interface.

Example 30. The non-transitory computer-readable storage medium of any combination of examples 20-29, wherein the computing device comprises a wearable computing device.

Example 31. The non-transitory computer-readable storage medium of example 30, wherein the wearable computing device comprises one of a head-mounted display and a smartwatch.

Example 32. The non-transitory computer-readable storage medium of any combination of examples 20-31, wherein the one or more available outputs include one or more of headphones, earbuds, a smartphone, a smart speaker, smart glasses, a smart television, an audio/visual receiver, and a smart display.

Example 33. An apparatus comprising: means for determining a proximity to the computing device for each of one or more available outputs; means for determining, based on the proximity determined for each of the one or more available outputs relative to every other one of the one or more available outputs, a ranked list of available outputs; and means for interfacing, with a display, to output a graphical user interface that includes at least a portion of the ranked list of available outputs.

Example 34. The apparatus of example 33, wherein the means for determining the proximity to the computing device for each of the one or more available outputs comprises means for determining, in response to initiating execution of an application, the proximity to the computing device for each of the one or more available outputs.

Example 35. The apparatus of example 34, further comprising means for determining whether a companion device is connected to the computing device; and wherein the means for determining the proximity to the computing device for each of the one or more available outputs comprises means for determining, based on the determination that the companion device is not connected to the computing device and initiating execution of the application, the proximity to the computing device for each of the one or more available outputs.

Example 36. The apparatus of example 34, further comprising means for determining a type of the application, wherein the means for determining the proximity to the computing device for each of the one or more available outputs comprises means for determining, responsive to the type of the application being an acceptable type for determining the proximity to the computing device for each of the one or more available outputs, the proximity to the computing device for each of the one or more available outputs.

Example 37. The apparatus of any combination of examples 33-36, wherein the means for determining the proximity to the computing device for each of the one or more available outputs comprises: means for interfacing with the one or more network interfaces to determine a round trip time for a data unit sent to each of the one or more available outputs; and means for determining, based on the round trip times for the data unit sent to each of the one or more available outputs, the proximity to the computing device for each of the one or more available outputs.

Example 38. The apparatus of any combination of examples 33-37, wherein the means for determining the ranked list of available outputs comprises means for ordering the one or more available outputs based on the proximity for each of the one or more available outputs from closest proximity to farthest proximity to obtain the ranked list of available outputs.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing device comprising:
one or more network interfaces configured to communicate with one or more available output devices for playing content; and
processing circuitry configured to:
responsive to initiating execution of an application, determine a type of the application;
responsive to determining that the type of the application is an acceptable type for casting the content to the one or more available output devices, determine a proximity to the computing device for each of the one or more available output devices;
determine, based on the proximity determined for each of the one or more available output devices relative to every other one of the one or more available output devices, a ranked list of available output devices; and
interface, with a display, a graphical user interface that includes at least a portion of the ranked list of available output devices.

2. The computing device of claim 1,
wherein the processing circuitry is further configured to determine whether a companion device is connected to the computing device; and
wherein the processing circuitry is configured to determine the proximity to the computing device for each of the one or more available output devices further in response to determining that the companion device is not connected to the computing device.

3. The computing device of claim 1, wherein, to determine the proximity to the computing device for each of the one or more available output devices, the processing circuitry is configured to:
interface with the one or more network interfaces to determine a round trip time for a data unit sent to each of the one or more available output devices; and
determine, based on the round trip times for the data unit sent to each of the one or more available output devices, the proximity to the computing device for each of the one or more available output devices.

4. The computing device of claim 1, wherein, to determine the ranked list of available output devices, the processing circuitry is configured to order the one or more available output devices based on the proximity for each of the one or more available output devices from closest proximity to farthest proximity to obtain the ranked list of available output devices.

5. The computing device of claim 1, wherein the processing circuitry is further configured to:
interface with the one or more network interfaces to scan for a new output not included in the one or more available output devices; and
add the new output to the one or more available output devices prior to determining the proximity to the computing devices for each of the one or more available output devices.

6. The computing device of claim 1, wherein the processing circuitry is further configured to:
determine a current output of the one or more available output devices to which the computing device is currently connected for playing the content; and interface, with the display, to update at least the portion of the graphical user interface to present the current output above the ranked list of available output devices.

7. The computing device of claim 1, wherein the processing circuitry is further configured to:
   determine a source providing the content; and
   interface, with the display, to update at least the portion of the graphical user interface to present the source above the ranked list of available output devices.

8. The computing device of claim 1, wherein the one or more interfaces include a wireless local area network interface, a personal area network interface, an ultrawide band interface, and a near field communication interface.

9. The computing device of claim 1, wherein the computing device comprises a wearable computing device.

10. The computing device of claim 9, wherein the wearable computing device comprises one of a head-mounted display and a smartwatch.

11. The computing device of claim 1, wherein the one or more available output devices include one or more of headphones, earbuds, a smartphone, a smart speaker, smart glasses, a smart television, an audio/visual receiver, and a smart display.

12. A method comprising:
   responsive to initiating execution of an application, determining, by processing circuitry of a computing device, a type of the application;
   responsive to determining that the type of the application is an acceptable type for casting content to one or more available output devices, determining, by the processing circuitry, a proximity of each of the one or more available output devices to the computing device;
   determining, by the processing circuitry and based on the proximity determined for each of the one or more available output devices relative to every other one of the one or more available output devices, a ranked list of available output devices; and
   interfacing, by the processing circuitry and with a display, to output a graphical user interface that includes at least a portion of the ranked list of available output devices.

13. The method of claim 12, further comprising:
   determining whether a companion device is connected to the computing device,
   wherein determining the proximity to the computing device for each of the one or more available output devices is in response to determining that the companion device is not connected to the computing device.

14. The method of claim 12, wherein determining the proximity to the computing device for each of the one or more available output devices comprises:
   determining, by the processing circuitry, a round trip time for a data unit sent to each of the one or more available output devices; and
   determining, based on the round trip times for the data unit sent to each of the one or more available output devices, the proximity to the computing device for each of the one or more available output devices.

15. The method of claim 12, wherein determining the ranked list of available output devices comprises ordering the one or more available output devices based on the proximity for each of the one or more available output devices from closest proximity to farthest proximity to obtain the ranked list of available output devices.

16. A non-transitory computer-readable storage medium having instructions stored thereon that, when executed by one or more processors of a computing device, cause the one or more processors to:
   responsive to initiating execution of an application, determine a type of the application;
   responsive to determining that the type of the application is an acceptable type for casting content to one or more available output devices, determine a proximity to the computing device for each of the one or more available output devices;
   determine, based on the proximity determined for each of the one or more available output devices relative to every other one of the one or more available output devices, a ranked list of available output devices; and
   interface, with a display, to output a graphical user interface that includes at least a portion of the ranked list of available output devices.

* * * * *